United States Patent [19]
Lickton

[11] Patent Number: 6,039,243
[45] Date of Patent: Mar. 21, 2000

[54] COLLAPSIBLE SHIPPING CONTAINER

[76] Inventor: Robert J. Lickton, 1612 78th Ct., Elmwood Park, Ill. 60635

[21] Appl. No.: 08/949,378

[22] Filed: Oct. 14, 1997

[51] Int. Cl.[7] .................. B62B 1/00; B65D 5/36
[52] U.S. Cl. .................. 229/117.01; 229/108.1; 229/115; 280/47.131; 280/47.18; 280/37; 280/641; 280/47.26; 280/33.998; 206/335; 220/8
[58] Field of Search .......... 280/47.131, 47.18, 280/37, 638, 639, 38, 641, 651, 47.19, 47.2, 47.24, 47.26, 47.33, 63, 79.2, 33.991, 33.998; 206/335; 220/6, 7, 8, 4.24, 4.33; 229/115, 108.1, 117.01

[56] References Cited

U.S. PATENT DOCUMENTS

| | | | |
|---|---|---|---|
| 1,912,847 | 6/1933 | Klepel | 206/503 |
| 2,490,186 | 12/1949 | Yarman | 206/335 |
| 2,490,804 | 12/1949 | Haas | 217/53 |
| 2,506,256 | 5/1950 | Waldo | 206/551 |
| 2,908,383 | 10/1959 | Vogt | 206/65 |
| 3,279,811 | 10/1966 | Mitty et al. | 280/47.26 |
| 3,427,040 | 2/1969 | Jenkins | 280/652 |
| 3,734,272 | 5/1973 | Galen | 206/1 R |
| 4,016,686 | 4/1977 | Hartger et al. | 52/65 |
| 4,033,243 | 7/1977 | Kirrish et al. | 85/4 |
| 4,299,313 | 11/1981 | Null | 280/47.26 |
| 4,339,041 | 7/1982 | Roberts et al. | 206/611 |
| 4,390,088 | 6/1983 | Brenner | 190/51 |
| 4,792,039 | 12/1988 | Dayton | 206/304 |
| 4,991,715 | 2/1991 | William | 206/335 |
| 5,193,702 | 3/1993 | Shannon | 220/23.4 |
| 5,464,237 | 11/1995 | Saporiti | 280/30 |
| 5,520,280 | 5/1996 | Lickton | 206/335 |
| 5,588,512 | 12/1996 | Lin | 280/37 |

FOREIGN PATENT DOCUMENTS

| | | |
|---|---|---|
| 659245 | 12/1927 | France . |
| 2396704 | 3/1979 | France . |
| 26142 | 11/1996 | United Kingdom . |

OTHER PUBLICATIONS

Bike Pro USA promotional literature (4 sheets).
Bicycle Catalog, pp. 63–64.

*Primary Examiner*—J. J. Swann
*Assistant Examiner*—James S. McClellan
*Attorney, Agent, or Firm*—Arnold White & Durkee

[57] ABSTRACT

A collapsible shipping container comprises a lid, a base, and a dolly. The lid includes a top wall and a plurality of lid side walls extending downward from the top wall. The base includes a bottom wall and a plurality of base side walls extending upward from the bottom wall. The top wall and the bottom wall are each generally triangular in shape. The base and the lid are releasably engageable to each other and are each convertible between an erected form and a collapsed form. The dolly includes a support frame and a pair of wheels rotatably mounted to the support frame. The support frame is connected to the base with the wheels projecting through respective holes formed in the base.

12 Claims, 10 Drawing Sheets

FIG. I

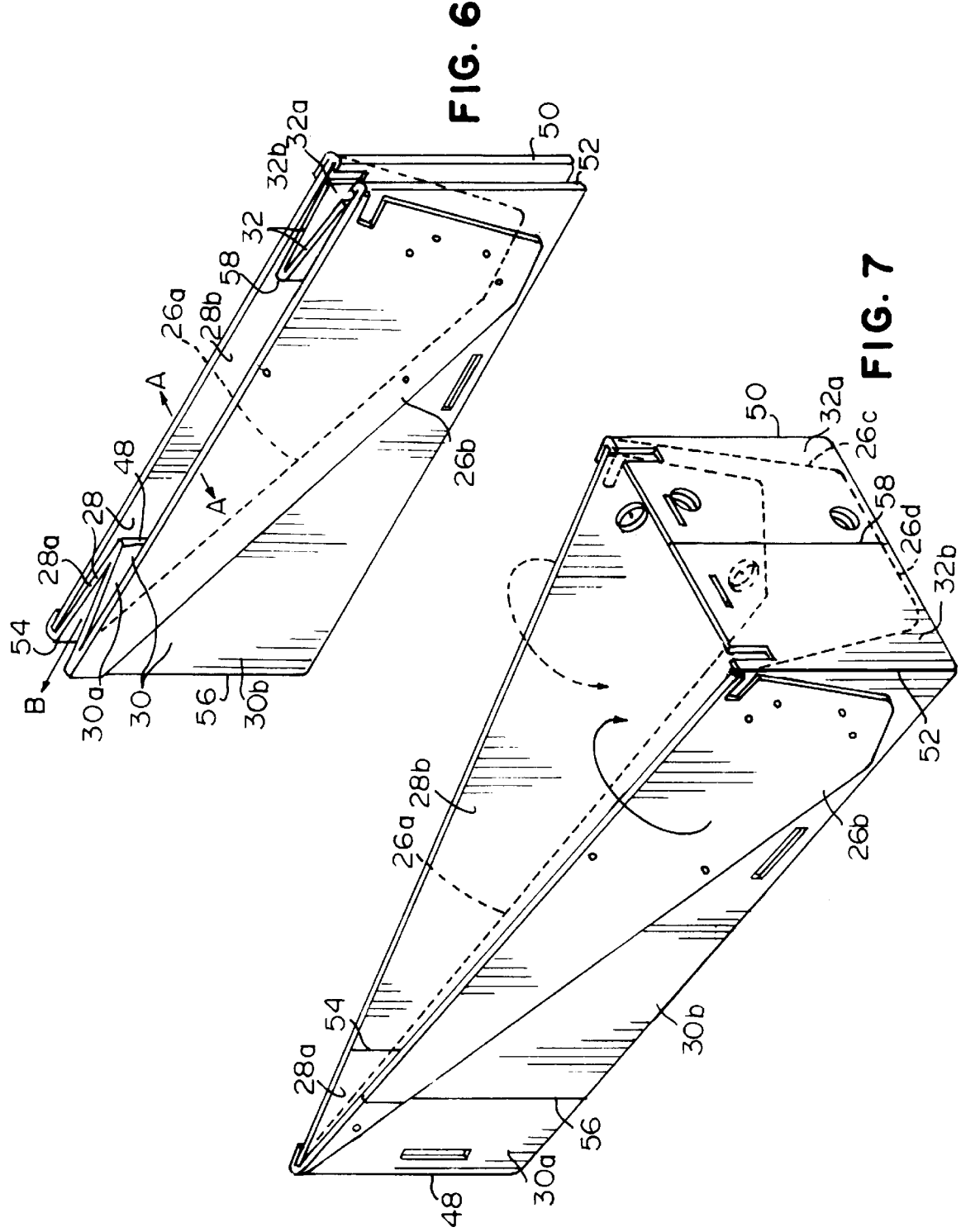

COLLAPSIBLE SHIPPING CONTAINER

FIELD OF THE INVENTION

The present invention relates generally to shipping containers and, more particularly, relates to a high-strength collapsible shipping container that is easy to assemble, move, and store.

BACKGROUND OF THE INVENTION

Travelers often require or desire the shipment of sporting goods, such as bicycles or golf clubs, by air or ground to a travel destination for use at that destination. The sporting goods are typically loaded into a hard-sided or soft-sided shipping container, which is then placed with other air or ground cargo and shipped to the travel destination. U.S. Pat. No. 5,520,280 to Lickton discloses an example of such a container especially suited for shipping bicycles.

Heretofore, containers for shipping sporting goods have suffered from one or more drawbacks. In the case of soft-sided containers, the container does not adequately protect its contents in abusive environments. The abuse imparted to the container during rough shipping and handling can damage its contents. In addition, manual transport of the loaded container can be fatiguing because the container typically lacks wheels to facilitate its transport. Therefore, unless the user has a separate cart or other means for moving the container, the user must manually lift and carry the container from one place to another. Also, due to the soft-sided nature of the container, it is not advisable to stack the container with other similar containers because of the damage that can result to its contents. Rather, it is common to haphazardly place the container in cargo without stacking or storing the container with other similar containers in a regular arrangement. Such haphazard storage of the container can promote abuse to the container during rough shipping and inefficient use of the storage space occupied by the cargo.

In the case of hard-sided containers, the container can be designed as in the aforementioned Lickton patent to minimize abuse to its contents and allow for easy manual transport and storage. Nonetheless, the present inventor has found that there is a need for a shipping container of the type disclosed in the Lickton patent, but with the additional advantage that the container is completely convertible between an erected form and a collapsed form. On the one hand, the container could be disposed in erected form when actually used to ship sporting goods. On the other hand, the container could be disposed in collapsed form when not in use, such as prior to being purchased or after being used to ship sporting goods. Prior to being purchased, it could be disposed in collapsed form to minimize the amount of space occupied at the point of sale. The efficient use of space can be of particular importance when the point of sale is an airport, where space is not readily available.

SUMMARY OF THE INVENTION

A collapsible shipping container comprises a lid, a base, and a dolly. The lid includes a top wall and a plurality of lid side walls extending downward from the top wall. The base includes a bottom wall and a plurality of base side walls extending upward from the bottom wall. The top wall and the bottom wall are each generally triangular in shape. The base and the lid are releasably engageable to each other and are each convertible between an erected form and a collapsed form. The dolly includes a support frame and a pair of wheels rotatably mounted to the support frame. The support frame is connected to the base with the wheels projecting through respective holes formed in the base.

In a preferred embodiment, the plurality of lid side walls include first, second, and third lid side walls. The first lid side wall includes a first lid nose portion and a first lid rearward portion hingedly connected to each other, and the second lid side wall includes a second lid nose portion and a second lid rearward portion hingedly connected to each other. The third lid side wall includes a pair of third lid side wall portions hingedly connected to each other. When the lid is converted from the erected form to the collapsed form, the first and second lid rearward portions are brought generally parallel to each other with the first and second lid nose portions and the pair of third lid side wall portions disposed between the first and second lid rearward portions.

Similarly, the plurality of base side walls include first, second, and third base side walls. The first base side wall includes a first base nose portion and a first base rearward portion hingedly connected to each other, and the second base side wall includes a second base nose portion and a second base rearward portion hingedly connected to each other. The third base side wall includes a pair of third base side wall portions hingedly connected to each other. When the base is converted from the erected from to the collapsed form, the first and second base rearward portions are brought generally parallel to each other with the first and second base nose portions and the pair of third base side wall portions disposed between the first and second base rearward portions.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which:

FIG. 6 is an isometric view of a base of the container in collapsed form;

FIG. 7 is an isometric view of the base in partially erected form after it has been opened in accordion-like fashion;

Figure 1:
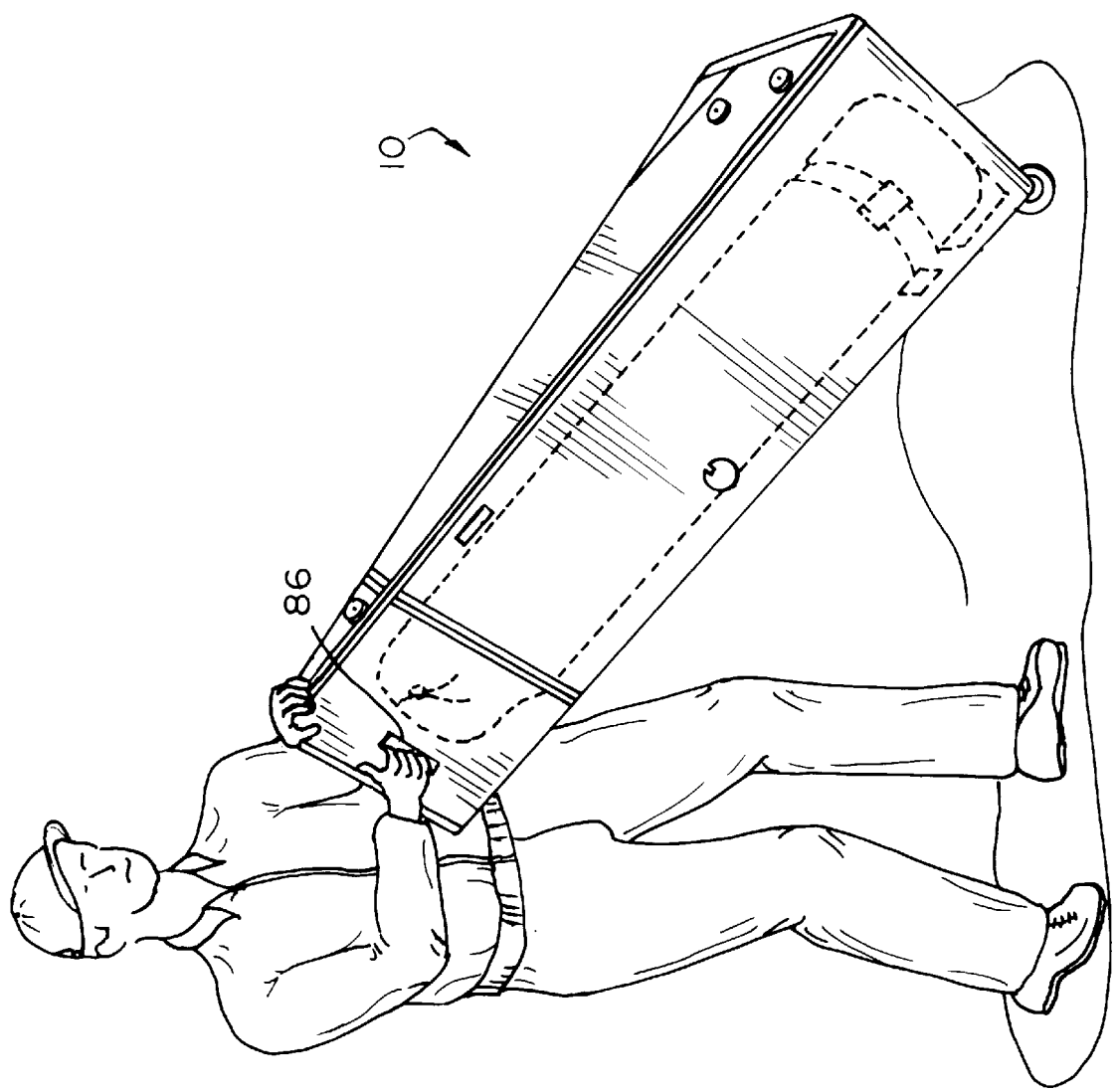
FIG. 1 is an isometric view of a collapsible shipping container embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

Turning now to the drawings, FIG. 1 depicts a collapsible shipping container 10 embodying the present invention. The container 10 is shown in erected form and in the process of being rolled along a support surface by a user. The container 10 is preferably used to ship sporting goods such as a bicycle or golf clubs. Alternatively, the container 10 may be used by a traveler in lieu of standard luggage. The size of the container 10 may be varied depending upon the requirements of the particular application involved. For example, if the container 10 is used to ship golf clubs as depicted in FIG. 1, the container 10 is preferably smaller than if it were used to ship a bicycle. To minimize the amount of free space inside the container 10, it is desirable to size the container 10 so that it is only a little larger than the sporting goods contained therein.

Figure 2:
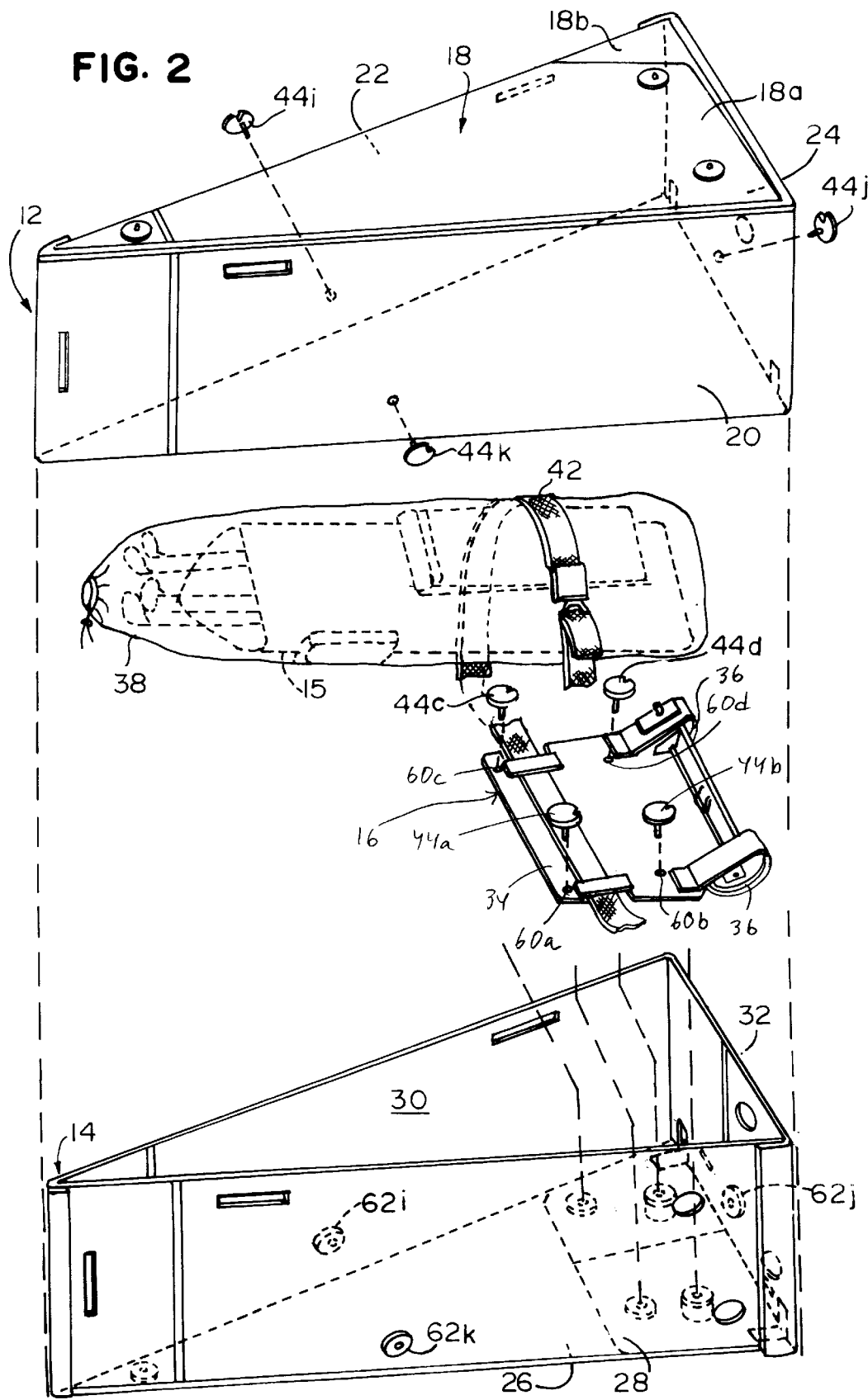
FIG. 2 is an exploded isometric view of the container.

Referring to FIG. 2, the container 10 comprises a lid 12, a base 14, and a dolly 16. The lid 12 and the base 14 are each substantially comprised of double-thickness corrugated board and convertible between an erected form and a collapsed form. The double-thickness corrugated board is sufficiently rigid to protect sporting goods such as golf clubs 15 within the container 10 from damage during rough shipping and handling.

FIG. 2 depicts both the lid 12 and the base 14 in their erected forms. The lid 12 includes a top wall 18 and a plurality of side walls 20, 22, and 24 extending downward from the top wall 18. The top wall 18 is generally triangular in shape, and the side walls 20, 22, and 24 are generally perpendicular to the top wall 18. The base 14 includes a bottom wall 26 and a plurality of side walls 28, 30, and 32 extending upward from the bottom wall 26. The bottom wall 26 is generally triangular in shape, and the base side walls 28, 30, and 32 are generally perpendicular to the bottom wall 26. In the preferred embodiment, the triangular shape of the top and bottom walls 18 and 26 is essentially an isosceles triangle.

Figure 14:
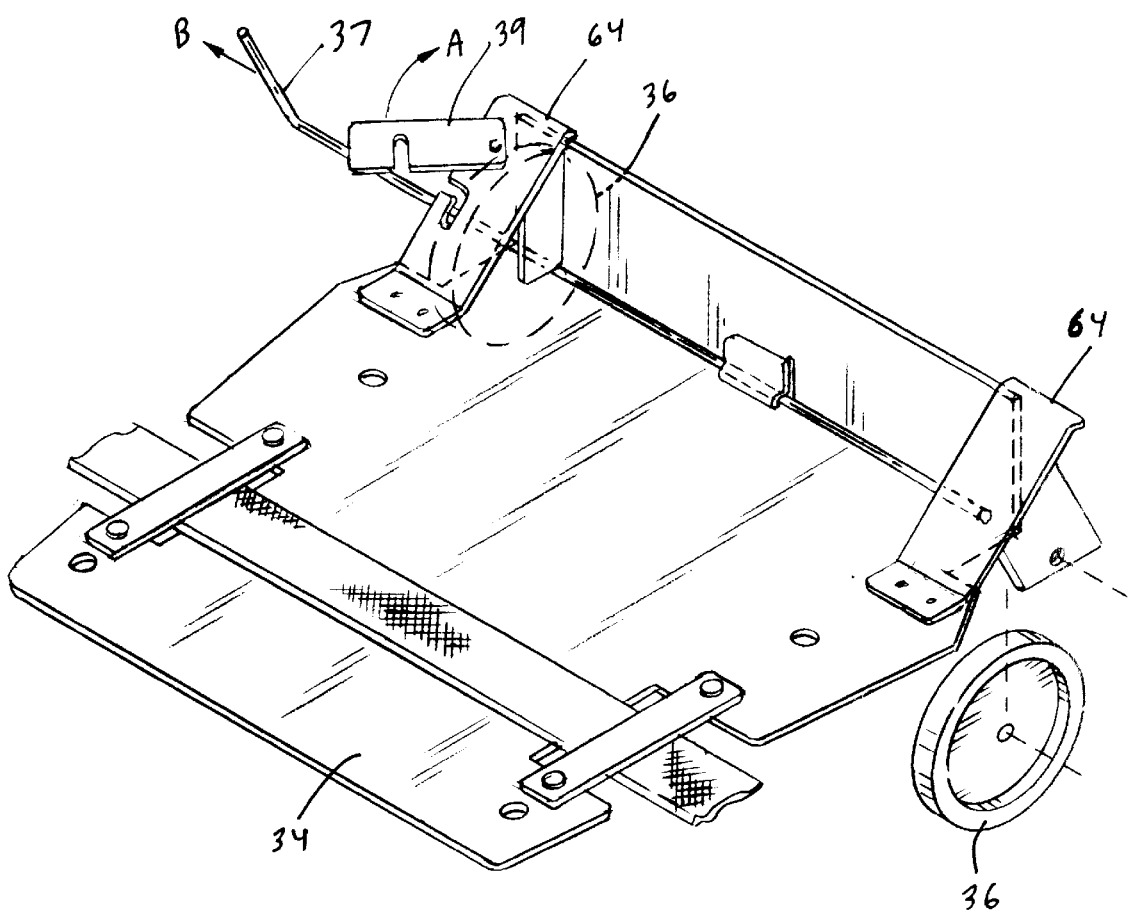
FIG. 14 is an exploded isometric view of the dolly of the container.

The dolly 16 includes a support frame 34 and a pair of wheels 36 rotatably mounted to the support frame 34. The support frame 34 is preferably composed of a unitary piece of metal such as steel. As best shown in FIG. 14, the wheels 36 are removably connected to the support frame 34 by a rod 37. A retaining member 39 holds the rod 37 in place. No tools are required to assemble or disassemble the dolly 16. For example, to disassemble the dolly 16, a user simply rotates the retaining member 39 in the direction of the arrow A to release the rod 37, and then pulls the rod 37 in the direction of the arrow B to detach the rod 37 from the support frame 34 and thereby release the wheels 36.

Figure 9:
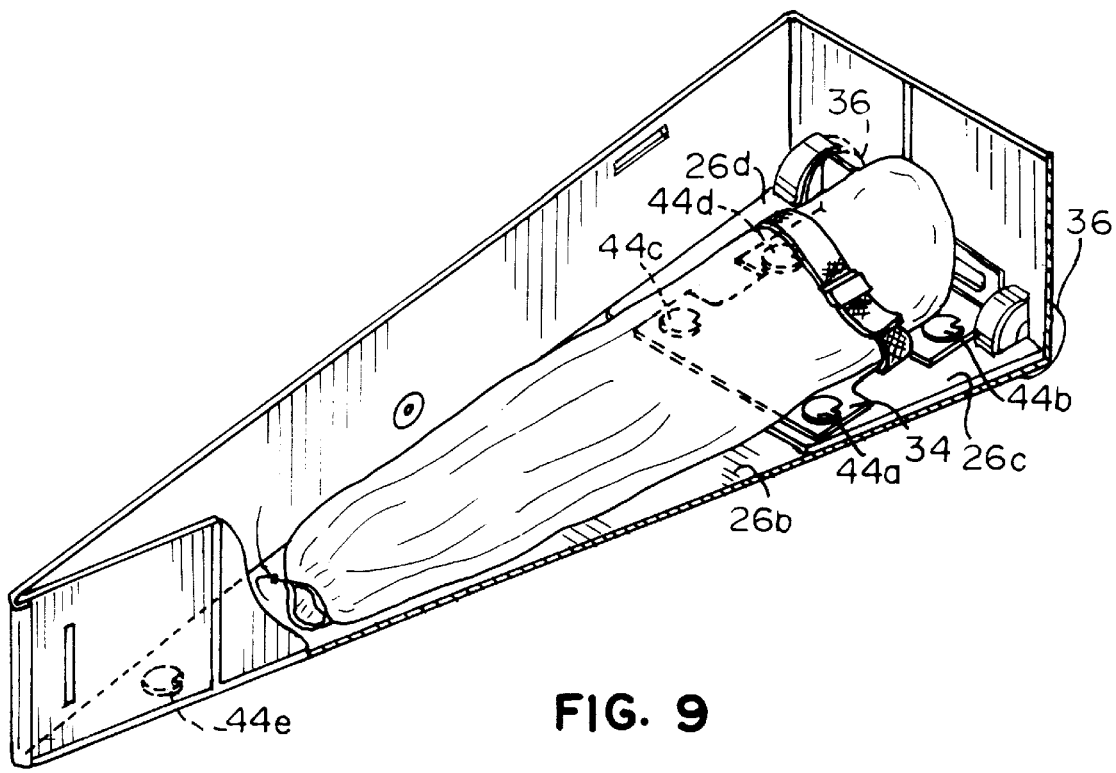
FIG. 9 is an isometric view of the erected base with a dolly installed therein.

When the container 10 is assembled, the support frame 34 is connected to the bottom wall 26 of the base 14 with the wheels 36 projecting through respective holes formed in the base 14. This is best shown in FIG. 9.

Figure 3:
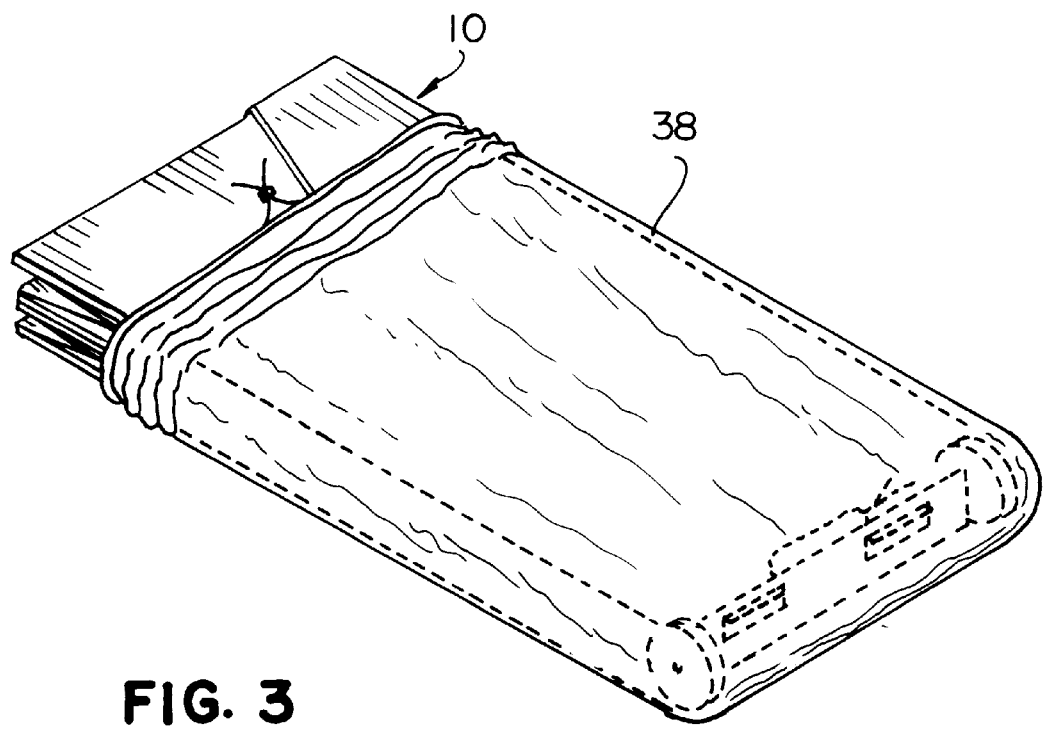
FIG. 3 is an isometric view of the container in collapsed and disassembled form in the process of being removed from an outer sack in which the container may be stored when it is not in use.
Figure 4:
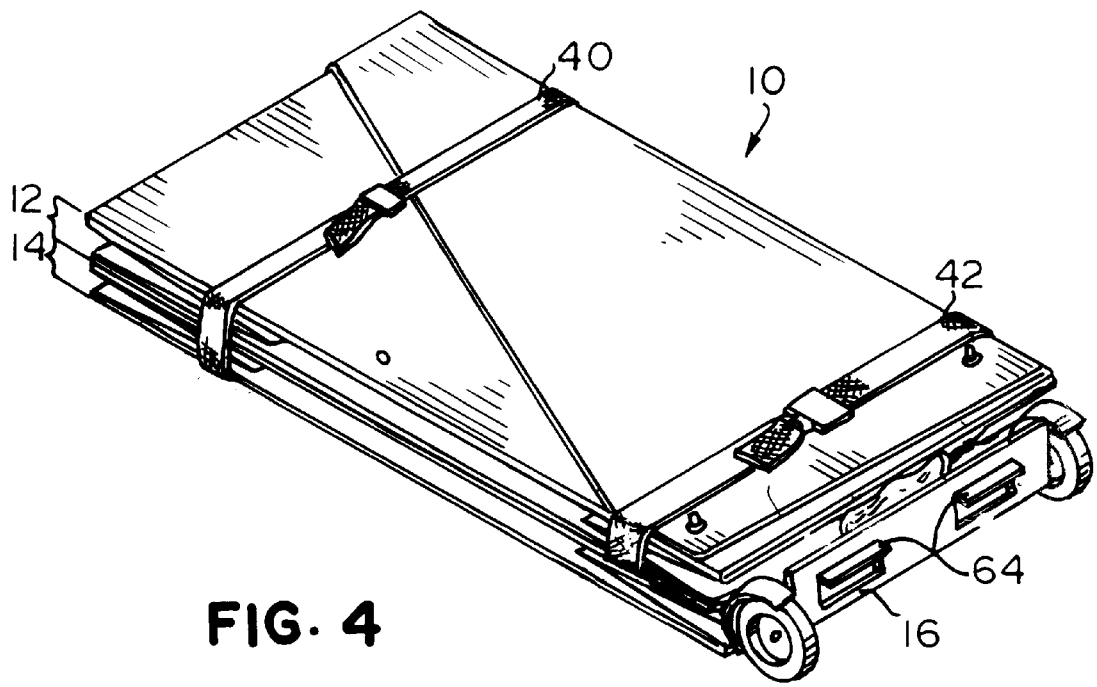
FIG. 4 is an isometric view of the container in collapsed and disassembled form after it has been removed from the outer sack of FIG. 3.

Referring to FIG. 3, when the container 10 is not in use, the container 10 is preferably disposed in collapsed form within a tear and puncture resistant outer sack 38 composed of TYVEK® spunbonded olefin, which is commercially available from the DuPont Company of Wilmington, Delaware. The outer sack 38 preferably includes a drawstring closure to securely close the mouth of the sack 38. When a user wishes to use the container 10, the user removes the container 10 from the outer sack 38 as shown in FIGS. 3 and 4. FIG. 4 shows the container 10 after it has been removed from the outer sack 38. The lid 12 and the base 14 are each disposed in collapsed form and are held together by a first retaining strap 40. The dolly 16 is secured to either the lid 12 or the base 14 (the lid 12 in the case of FIG. 4) by a second retaining strap 42. The strap 42 is passed through apertures in the dolly 16 (see FIG. 5) and then around either the lid 12 or the base 14. The straps 40 and 42 are preferably composed of a flexible material such as woven fabric. Conventional snap-lock buckles are used to detachably engage the ends of each strap. To insure that the straps are taut, any slack in the straps can be eliminated by pulling on free end sections of the straps extending from the buckles.

Figure 5:
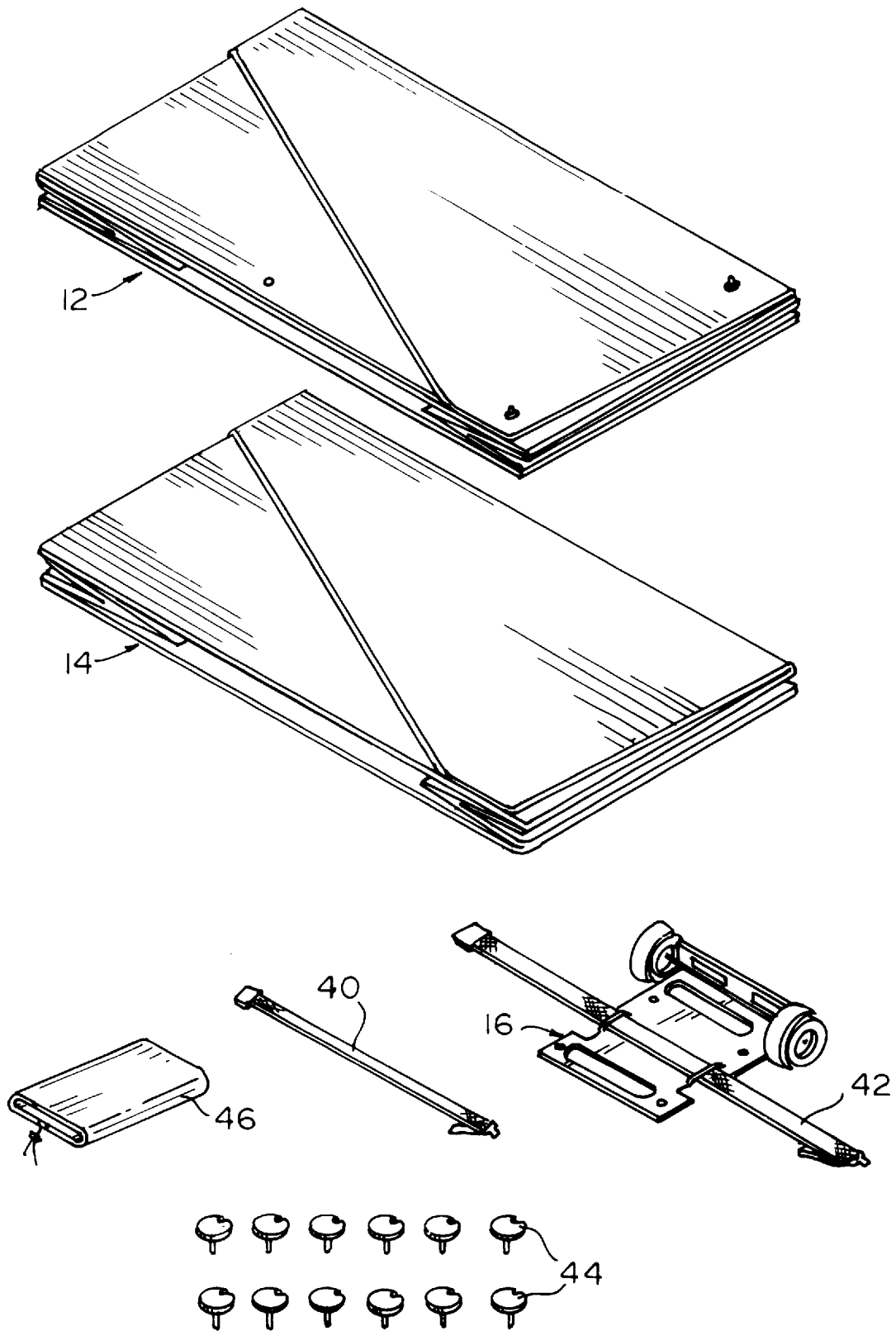
FIG. 5 is an exploded isometric view of the container in collapsed and disassembled form showing the components of the container.

FIG. 5 depicts the unassembled parts of the container 10 supplied within the sack 38 of FIG. 3. The unassembled parts include the collapsed lid 12, the collapsed base 14, the dolly 16, the pair of straps 40 and 42, male fastener portions 44, and a small inner sack 46. The collapsed lid 12 is separated from the collapsed base 14 by operating the buckle of the strap 40 and removing the strap 40. Similarly, the dolly 16 is separated from the lid 12 or the base 14, depending on which one it is secured to, by operating the buckle of the strap 42. The strap 42 remains with the dolly 16.

Like the outer sack 38, the inner sack 46 is preferably composed of TYVEK® spunbonded olefin and includes a drawstring closure to securely close the mouth of the sack 46. The sack 46 is used to hold the male fastener portions 44 when the container 10 is not in use. The male fastener portions 44 are disposed within the inner sack 46 which is, in turn, disposed within the outer sack 38. When a user wishes to assemble the container 10 from the unassembled parts in FIG. 5, the male fastener portions 44 are removed from the sack 46.

Figure 8:
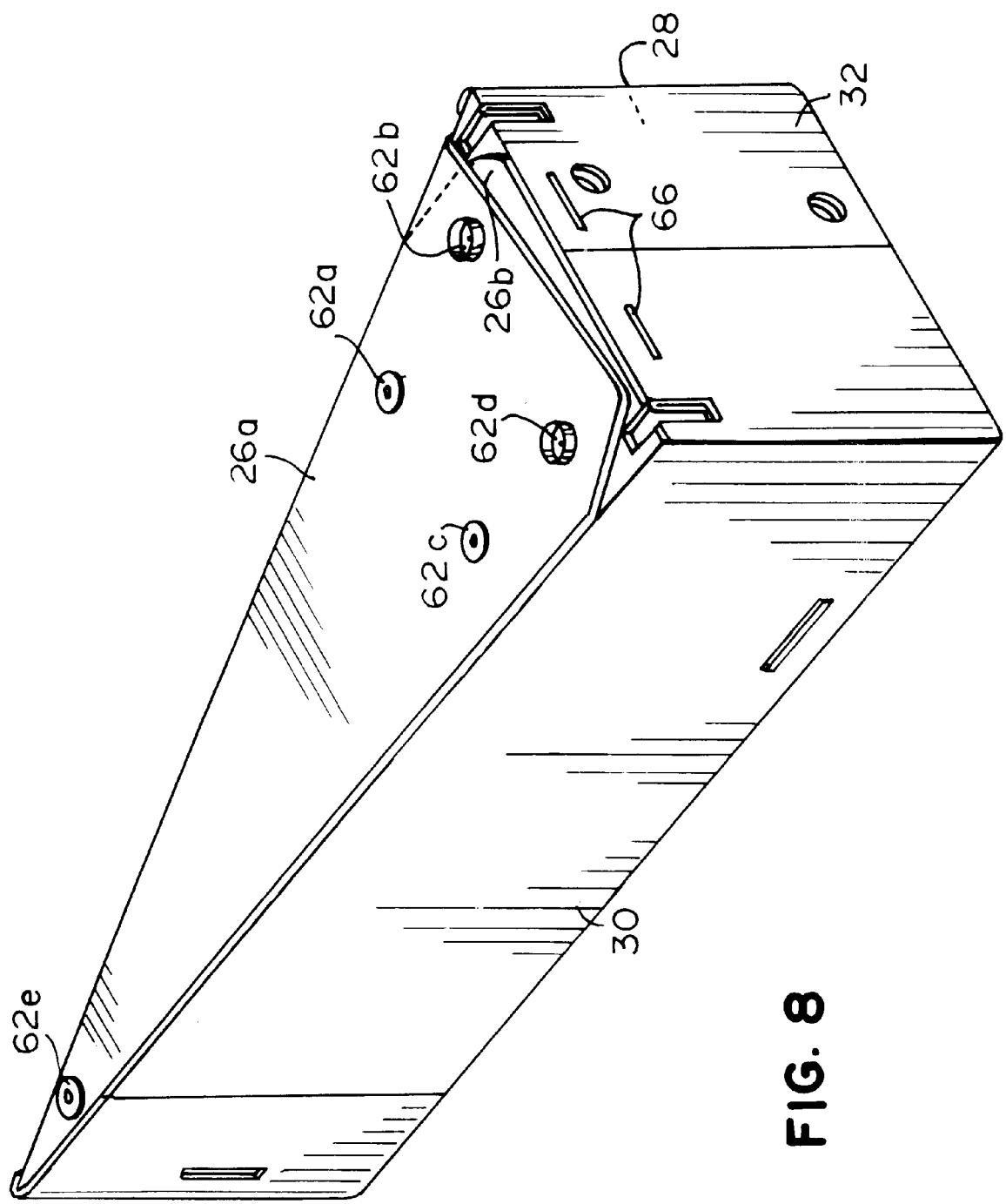
FIG. 8 is an isometric view of the base in erected form after its wing flaps have been folded inward to form a bottom wall of the base.

To assemble the container 10 from the unassembled parts in FIG. 5, a user erects the lid 12 and the base 14 from their collapsed forms. FIGS. 6, 7, and 8 depict the sequence of steps for erecting the base 14. Referring to FIG. 6, there is shown the base 14 in inverted collapsed form. The side walls 28 and 30 are hingedly connected to each other along a first fold line 48 and are hingedly connected to the third side wall along respective second and third fold lines 50 and 52. The side wall 28 includes a nose portion 28a and a rearward portion 28b hingedly connected to each other along a fourth fold line 54. The side wall 30 includes a nose portion 30a and a rearward portion 30b hingedly connected to each other along a fifth fold line 56. The side wall 32 includes a pair of third side wall portions 32a and 32b hingedly connected to each other along a sixth fold line 58. The bottom wall 26 (see FIG. 2) of the base 14 is created from first and second wing flaps 26a and 26b hingedly connected to the respective side walls 28 and 30 and by a pair of minor flaps 26c and 26d (see FIG. 7) hingedly connected to the respective third side wall portions 32a and 32d.

When the base 14 is disposed in the collapsed form depicted in FIG. 6, the panels and flaps are arranged as follows. The rearward portions 28b and 30b are in close proximity to each other. Also, the rearward portions 28b and 30b are generally parallel to each other with the nose portions 28a and 30a and the third side wall portions 32a and 32b disposed between the rearward portions 28b and 30b. The wing flaps 26a and 26b are disposed alongside the respective side walls 28 and 30. The minor flaps 26c and 26d (see FIG. 7) generally overlap the respective third side wall portions 32a and 32b. The minor flap 26c is disposed between the third side wall portion 32a and the rearward portion 28b, while the minor flap 26d is disposed between the third side wall portion 32b and the rearward portion 30b.

To realize the triangular base configuration in FIG. 7 from the collapsed base 14 in FIG. 6, the base 14 is opened in accordion-like fashion. More specifically, the rearward portions 28b and 30b are first pulled away from each other in the direction of the arrows A in FIG. 6 until (a) the third side wall portions 32a and 32b are generally coplanar with each other and (b) the nose portions 28a and 30a are generally coplanar with each other. Next, the fold line 48 joining the nose portions 28a and 30a is pulled outward in the direction of the arrow B in FIG. 6 until (a) the nose portion 28a is generally coplanar with the rearward portion 28b and (b) the nose portion 30a is generally coplanar with the rearward portion 30b. After performing the above steps, the base 14 appears as shown in FIG. 7.

To realize the erected form in FIG. 8 from the partially erected base 14 in FIG. 7, the wing flaps 26a and 26b are folded inward. More specifically, the wing flap 26b is first folded inward relative to the side wall 30. Subsequently, the wing flap 26a is folded inward relative to the side wall 28 so that the wing flap 26a substantially overlaps the wing flap 26b.

After converting the base 14 to the erected form in FIG. 8, the base 14 is returned to a right side up position while holding the wing flaps 26a and 26b in their folded positions. By force of gravity, the third side wall portions 26c and 26d rotate downward into contact with the wing flap 26b (see FIG. 9).

Referring to FIG. 9, to retain the base 14 in its erected form, the dolly 16 is installed and fastened to the base 14 using male fastener portions 44a–d and one or more additional male fastener portions 44e are installed elsewhere in the base 14. To install the dolly 16, the dolly 16 is first lowered into the base 14 (see FIG. 2) with the support frame 34 contacting the bottom wall 26 and the wheels 36 projecting from respective holes formed in the base. The support frame 34 forms a plurality of holes 60a–d (see FIG. 2) for receiving respective fastener portions 44a–d. The fastener portions 44a–d are inserted through the respective holes 60a–d and threadably engaged with mating fastener portions 62a–d (see FIG. 8) pre-installed in the wing flap 26a of the base 14. The wing flap 26b and the minor flaps 26c and 26d, which overlie the wing flap 26a in FIG. 9, include holes aligned with the respective pre-installed fastener portions 62a–d and the respective holes 60a–d of the support frame 34 in order to expose the fastener portions 62a–d for engagement with the respective fastener portions 44a–d. The fastener portions 44a–d serve to attach the dolly 16 to the base 14 and, at the same time, to secure the wing flaps 26a and 26b and minor flaps 26c and 26d which form the bottom wall 26. To insure proper alignment of the holes 60a–d of the support frame 34 relative to the pre-installed fastener portions 62a–d, the dolly 16 is optionally provided with narrow locating ridges 64 (see FIGS. 4 and 14) that should project through corresponding slots 66 (see FIG. 8) formed in the side wall 32 of the base 14.

The male fastener portion 44e is threadably engaged with a mating fastener portion 62e (see FIG. 8) pre-installed in a nose portion of the wing flap 26a. The wing flap 26b, which overlies the wing flap 26a, includes a hole aligned with the fastener portion 62e in order to expose it for engagement with the fastener portion 44e.

Figure 10:
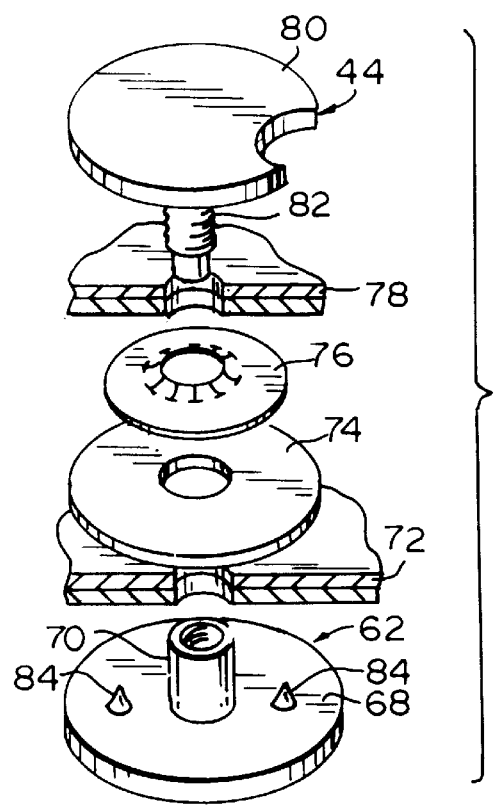
FIG. 10 is an exploded isometric view of a fastener for holding a pair of corrugated board sections together where the board sections are shown in cross-section.

FIG. 10 depicts a typical fastener formed by the combination of first and second fastener portions 44 and 62. The fastener portion 62 is preferably of a "female" type and includes a disc-shaped head 68 and a hollow body 70 extending from the disc-shaped head 68. The hollow body 70 is threaded on an inner surface thereof. The female fastener portion 62 is pre-installed on section 72 of corrugated board using a washer 74 and a push nut 76. In particular, the hollow body 70 of the fastener portion 62 is first inserted through a hole formed in the board section 72 such that the disc-shaped head 68 bears against a lower surface of the board section 72. The washer 74 and then the push nut 76 are placed over the portion of the hollow body 70 extending above the board section 72 such that the washer 74 bears against an upper surface of the board section 72 and the push nut 76 bears against the washer 74. The push nut 76 engages an outer surface of the hollow body 70 to retain the fastener portion 62 in its installed position.

The fastener portion 44 is of a "male" type and is used to secure a section 78 of corrugated board to the board section 72. The male fastener portion 44 includes a disc-shaped head 80 and a solid body 82 extending from the disc-shaped head 80. The solid body 82 is threaded on an outer surface thereof. To secure the board section 78 to the board section 72, the solid body 82 is inserted through a hole formed in the board section 78 and into the hollow body 70 of the female fastener portion 62. The male fastener portion 44 is then rotated to threadably engage the solid body 82 with the hollow body 70. The female fastener portion 62 preferably includes a pair of pins 84 that burrow into the board section 72 to prevent the fastener portion 62 from rotating while being engaged by the male fastener portion 44.

The board sections 72 and 78 may be formed by any of the various folded flaps of the lid 12 or the base 14 which are secured to each other. For example, the board section 72 may be formed by the nose portion of the wing flap 26a, while the board section 78 may be formed by the nose portion of the wing flap 26b. In this example, the male fastener portion is identified by the reference numeral 44e in FIG. 9, while the female fastener portion is identified by the reference numeral 62e in FIG. 8.

Although FIG. 10 depicts only the two board sections 72 and 78 being held together by the fastener portions 44 and 62, additional board sections may be held in place so long as the combined thickness of the secured board sections is approximately equal to the length of the hollow body 70 of the female fastener portion 62. This will insure that the board sections are snugly held together with minimal room for movement. Each board section should include a hole for receiving the hollow body 70 of the female fastener portion 62 because the hollow body 70 should protrude through all board sections to be held together.

Figure 11:
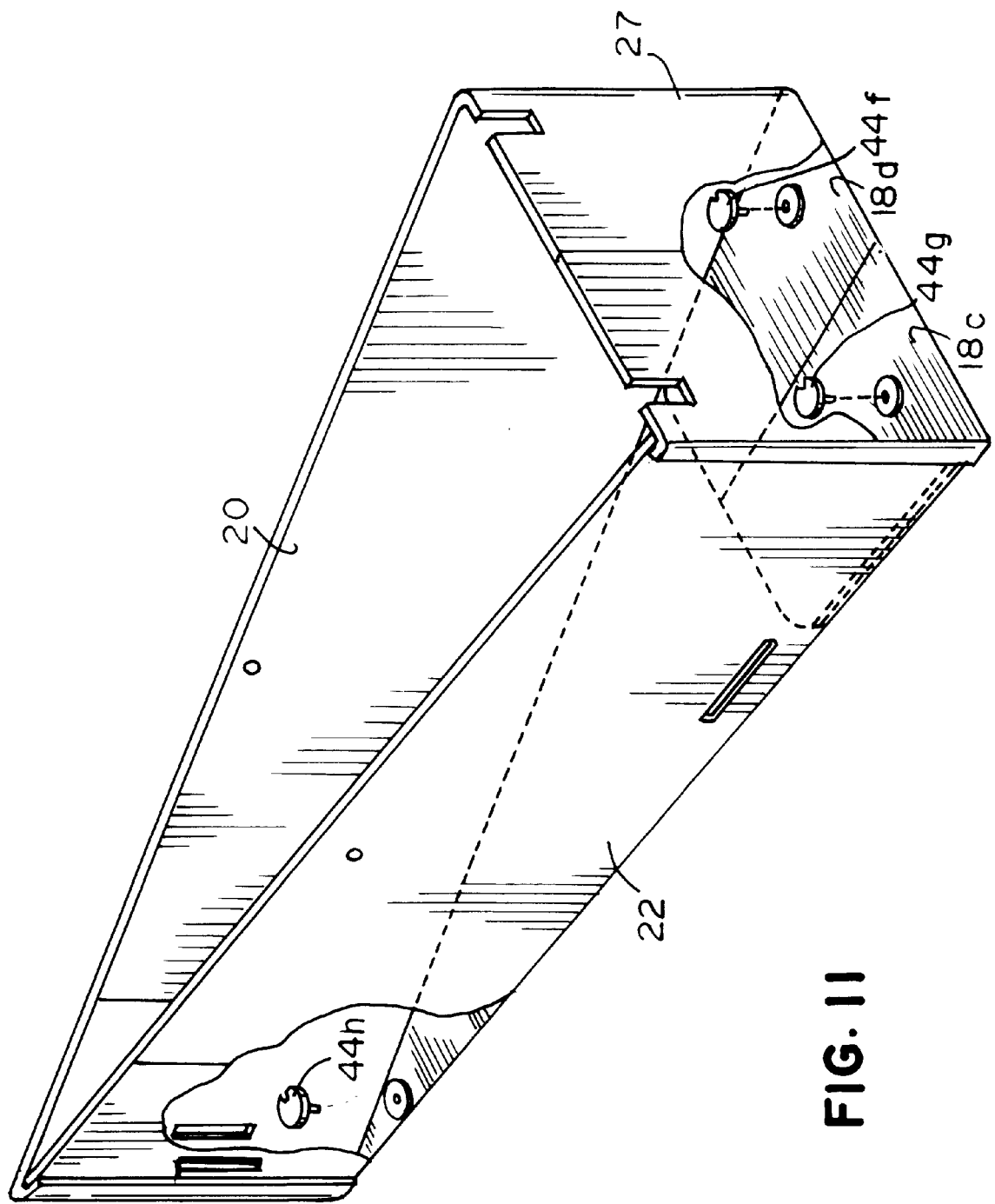
FIG. 11 is an isometric view of a lid of the container in erected form.

With the exception of the portions of the base specifically designed for installation of the dolly 16, the lid 12 is substantially similar to the base 14. Therefore, the manner in which the lid 12 is erected is not described in detail herein. It suffices to state that, like the base 14, the lid 12 includes three side walls 20, 22, and 24 (see FIG. 2), and the top wall 18 is formed by a pair of wing flaps 18a and 18b hingedly connected to the respective side walls 20 and 22 and by a pair of minor flaps 18c and 18d (see FIG. 11) hingedly connected to the side wall 24. The lid 12 is opened in accordion-like fashion and its wing flaps are folded inward as shown for the base 14 in FIGS. 6–8. The resulting erected form of the lid 12 is depicted in FIG. 11. To retain the lid 12 in its erected form, there are provided three male fastener portions 44f, 44g, and 44h that threadably engage three female fastener portions pre-installed in the lid 12 as shown in FIG. 11. The male fastener portions 44f and 44g hold the wing flaps and minor flaps together, while the male fastener portion 44h holds the nose portions of the wing flaps together.

After erecting both the lid 12 and the base 14, sporting goods such as golf clubs may be placed in the base 14. Referring to FIG. 2, the golf clubs 15 are preferably first inserted into the sack 38, which is also used to hold the collapsed container 10 when it is not in use, and are then placed in the base 14 with their heads oriented toward the pointed end of the base 14 (see FIG. 1). The pointed end of the base 14, as well as the sack 38, restrict motion of the club heads during rough shipping and handling. To secure the golf clubs 15 to the base 14, the strap 42 (see also FIG. 9) is wrapped around the golf clubs 15. To close the filled container 10, the lid 12 is placed over the base 14 such that the first, second, and third lid side walls 20, 22, and 24 generally overlap the respective first, second, and third base side walls 28, 30, and 32. The lid 12 is slightly larger than the base 14 to allow for such placement of the lid 12 over the base 14. After placing the lid 12 over the base 14, the lid 12 is secured to the base 14 using a plurality of male fastener portions 44i, 44j, and 44k that engage corresponding female fastener portions 62i, 62j, and 62k pre-installed in the base 14. The closed container 10 is illustrated in FIG. 1.

As best shown in FIG. 1, the container 10 includes a handle 86 near its pointed end to allow a user to easily lift that end of the container 10 off a support surface and move the container 10 by rolling its wheels along the support surface.

Figure 12:
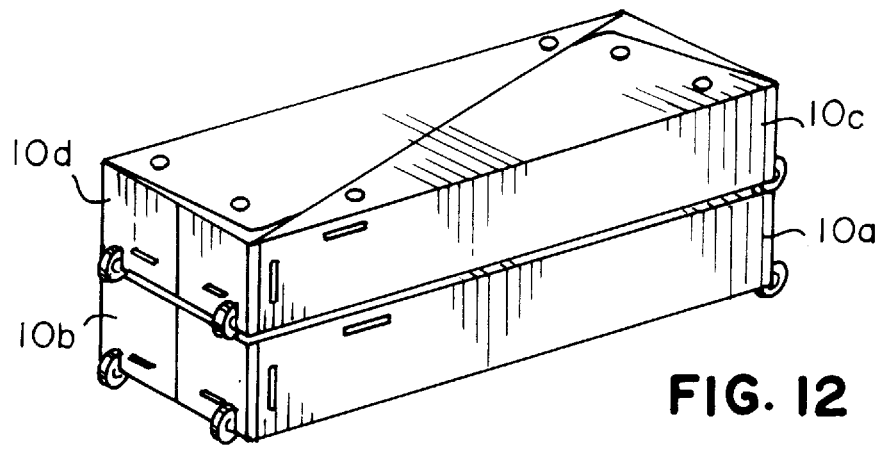
FIG. 12 is an isometric view of a plurality of the containers arranged side-by-side and stacked on top of one another.

As best shown in FIG. 12, a plurality of closed containers 10 can be closely arranged to fit in a small area by arranging adjacent containers to point in opposite directions. In FIG. 12, for example, the container 10a is oriented in an opposite direction relative to its adjacent container 10b. Similarly, the container 10c is oriented in an opposite direction relative to its adjacent container 10d. It can be seen that the close arrangement of the containers in FIG. 12 directly follows from the triangular shape of the container 10.

Figure 13:
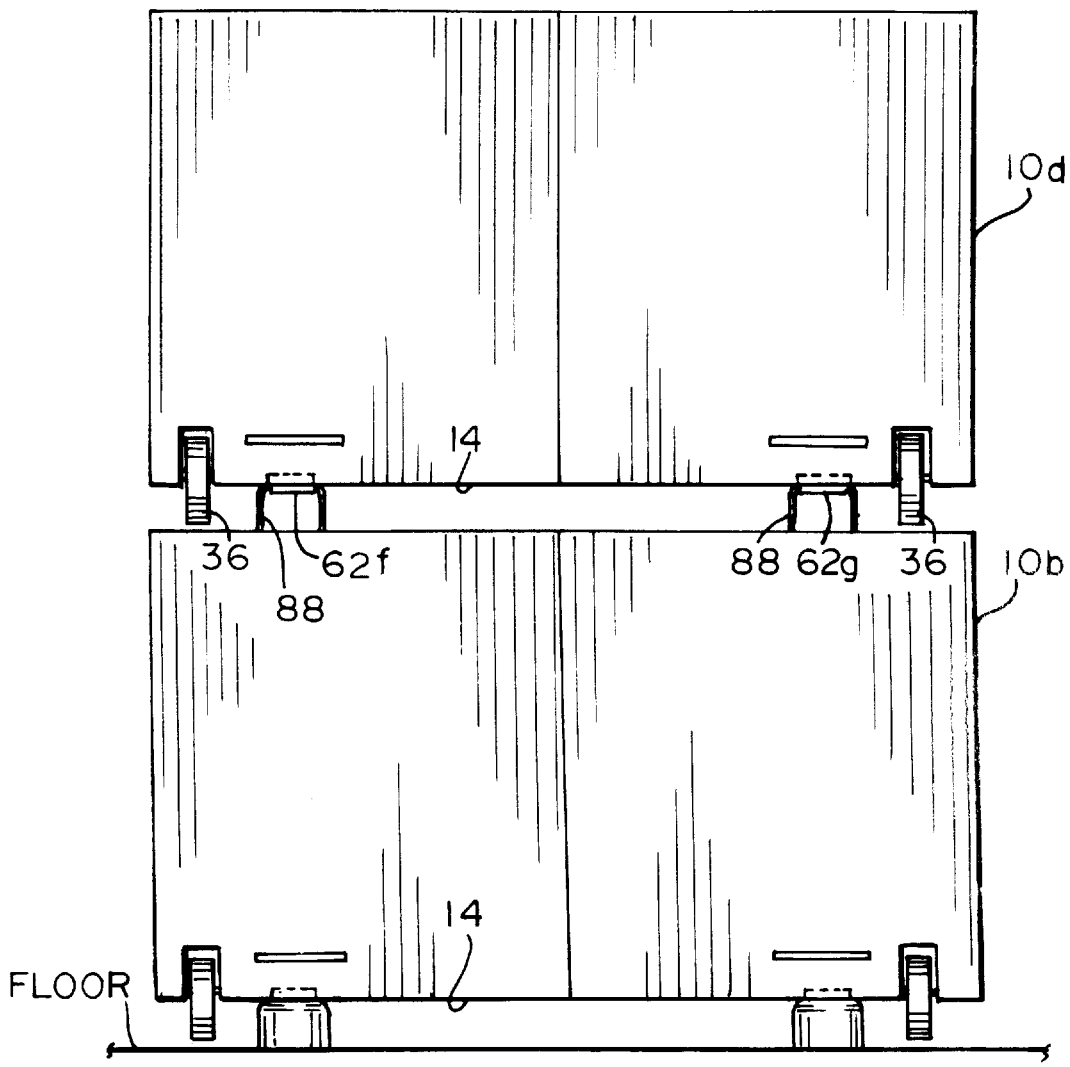
FIG. 13 is an end view of the containers in FIG. 12.

In addition to arranging containers 10 side-by-side, a plurality of containers 10 may be stacked on top of one another as shown in FIG. 12. Specifically, FIG. 12 depicts the containers 10c and 10d stacked on top of the respective containers 10a and 10b. The number of containers which may be stacked on top of one another is determined by the height of the cargo compartment into which the containers are loaded for shipment. To assist in positioning the upper containers 10c and 10d relative to the lower containers 10a and 10b, each container is provided with a pair of feet mounted to the bottom wall of the base 14. FIG. 13 is an end view of the container arrangement in FIG. 12 showing these feet 88 on the containers 10b and 10d. The feet 88 are in the form of cups attached to the base 14 using fasteners. The downwardly-facing mouth ends of the cups on the upper container 10d fit over the disc-shaped heads of the female fastener portions 62f and 62g pre-installed in the lid 12 of the lower container 10b. In addition to their locating function, the female fastener portions 62f and 62g serve to engage the respective male fastener portions 44f and 44g when erecting the lid 12 (see FIG. 11).

Although the feet 88 on the lower container 10b do not serve a positioning function, the feet 88 on the lower container 10b do serve a significant support function. While the container 10b is resting on a support surface with its bottom wall generally parallel to that surface, the container 10b is supported by the feet 88 and not the wheels 36 to minimize stress on the dolly 16.

After the container 10 is used to ship sporting goods to a destination, the container 10 is disassembled and the lid 12 and the base 14 are converted from their erected forms to their collapsed forms. The lid 12 and the base 14 are collapsed using the steps depicted in FIGS. 6, 7, 8, 9, and 11, but performed in reverse order. For example, to collapse the base 14, the following steps are performed. First, after removing the male fastener portions, the wing flaps 26a and 26b are folded relative to the respective side walls 28 and 30 such that the wing flaps 26a and 26b are alongside the respective side walls 28 and 30 (FIG. 7). Second, the minor flaps 26c and 26d are folded relative to the respective third side wall portions 32a and 32b such that the minor flaps generally overlap the respective third side walls portions 32a and 32b (FIG. 7). Third, the nose portions 28a and 30a are folded relative to each other along the first fold line 48 and relative to the respective rearward portions 28b and 30b along the respective fourth and fifth fold lines 54 and 56 such that the nose portions are disposed between the rearward portions 28b and 30b (FIG. 6). Fourth, the third side wall portions 32a and 32b are folded relative to each other along the sixth fold line 58 and relative to the respective rearward portions 28b and 30b along the respective second and third fold lines 50 and 52 such that the third side wall portions are disposed between the rearward portions 28b and 30b (FIG. 6). In the collapsed form, the rearward portions 28b and 30b are generally parallel to each other (FIG. 6). The lid 12 is collapsed in similar fashion.

The disassembled container can be bound as shown in FIG. 4 and stored in the sack 38 as shown in FIG. 3. The container 10 is sufficiently resistant to rough shipping and handling that it can be repeatedly used without the need to discard the container. And, if the time should come that the container 10 should be discarded, the corrugated board of the lid and the base may be recycled. Any non-recyclable components, such as the dolly 16, attached to the corrugated board may be detached therefrom prior to disposal and used with corrugated board forming a new lid and a new base.

To prevent cracking or tearing of the container 10 along its various fold lines, especially in light of its repeated use, a bi-directional filament tape is preferably applied to these fold lines. The filament tape allows the panels and the flaps of the container 10 to hinge in both directions without adding significant weight to the container 10. One such filament tape is commercially available as product no. 8959 from Minnesota Mining & Manufacturing Co. (3M) of St. Paul, Minn.

While the present invention has been described with reference to one or more particular embodiments, those skilled in the art will recognize that many changes may be made thereto without departing from the spirit and scope of the present invention. For example, the container 10 may be provided with various mounting elements for securing a bicycle. These mounting elements are disclosed in U.S. Pat. No. 5,520,280 to Lickton, which is incorporated herein by reference in its entirety. Each of these embodiments and obvious variations thereof is contemplated as falling within the spirit and scope of the claimed invention, which is set forth in the following claims.

What is claimed is:

1. A collapsible shipping container, comprising a generally triangular-shaped container body having a first side wall, a second side wall, and a third side wall, said first and second side walls including respective first and second fold lines extending transversely to a length of said respective first and second side walls, said first and second side walls being hingedly joined to each other at an apex of said container body, said first side wall including a first nose portion extending between said first fold line and said apex, said second side wall including a second nose portion extending between said second fold line and said apex, said third side wall including a third fold line extending transversely to a length of said third side wall, said first and second nose portions being inwardly foldable about said respective first and second fold lines to a position between remaining rearward portions of said first and second side walls upon collapsing said container, said third side wall being inwardly foldable along said third fold line to a position between said remaining rearward portions of said first and second side walls upon collapsing said container.

2. The collapsible shipping container as set forth in claim 1, wherein said container body forms a lid of said collapsible container.

3. The collapsible shipping container as set forth in claim 1, wherein said container body forms a base of said collapsible container.

4. The collapsible shipping container as set forth in claim 1, further comprising a dolly connected to said container body, said dolly including a support frame and at least one wheel mounted on said support frame.

5. The collapsible shipping container as set forth in claim 1, further comprising at least one fastener for maintaining said container body in an erected configuration.

6. The collapsible shipping container as set forth in claim 1, further comprising at least one fastener for maintaining said container body in a collapsed configuration.

7. The collapsible shipping container as set forth in claim 1, further comprising first and second wing flaps hingedly connected to said respective first and second side walls, said first and second wing flaps forming at least a portion of a top wall or a bottom wall of said container body, said first and second wing flaps being generally perpendicular to said respective first and second side walls when said container is in an erected configuration.

8. The collapsible shipping container as set forth in claim 7, wherein said first and second wing flaps are generally parallel to and alongside said respective first and second side walls when said container is in a collapsed configuration.

9. The collapsible shipping container as set forth in claim 8, wherein said first and second wing flaps are substantially disposed outside said container body when said container is in said collapsed configuration.

10. The collapsible shipping container as set forth in claim 7, further comprising a pair of minor flaps hingedly connected to said third side wall, said minor flaps forming at least a portion of a top wall or a bottom wall of said container body, said minor flaps being generally perpendicular to said third side wall when said container is in said erected configuration.

11. The collapsible shipping container as set forth in claim 10, wherein said minor flaps are generally parallel to and alongside said third side wall when, said container is in a collapsed configuration.

12. The collapsible shipping container as set forth in claim 1 wherein said third side wall is hingedly joined to said first and second side walls along respective fourth and fifth fold lines, said remaining rearward portion of said first side wall extending between said first fold line and said fourth fold line, said remaining rearward portion of said second side wall extending between said second fold line and said fifth fold line, said third side wall being inwardly foldable along said third, fourth, and fifth fold lines to a position between said remaining rearward portions of said first and second side walls upon collapsing said container.

* * * * *